Patented Jan. 15, 1935

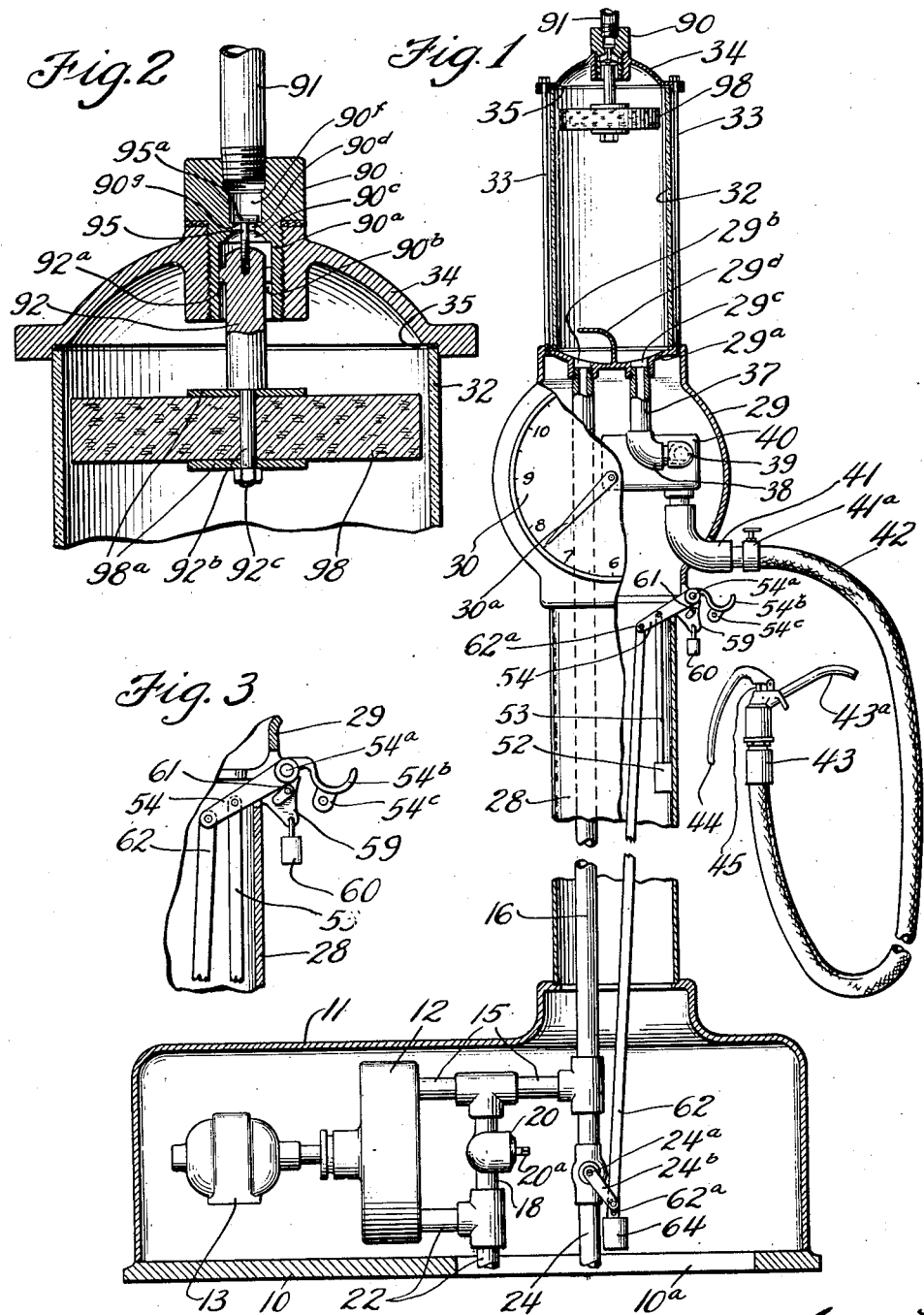

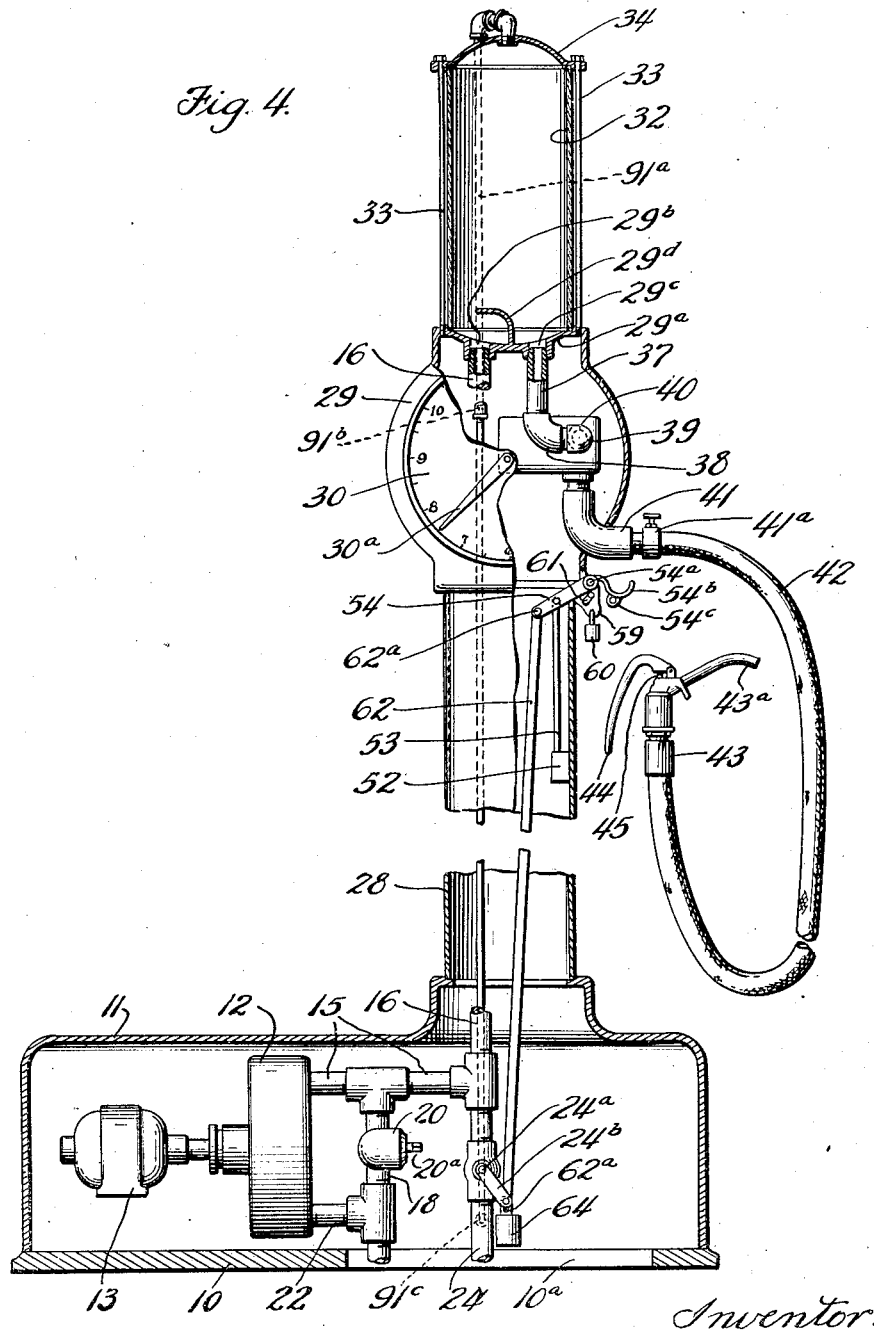

1,987,766

UNITED STATES PATENT OFFICE 1,987,766

LIQUID DISPENSING APPARATUS

Austin L. Wertz, Cleveland, Ohio, assignor, by mesne assignments, to S. F. Bowser and Company, Inc., a corporation of Indiana Application August 28, 1929, Serial No. 388,891

11 Claims. (Cl. 221—95)

This invention relates to liquid dispensing apparatus and has for an object to provide such an apparatus in which is included a reservoir of the visible type provided with a transparent side wall or portion rendering the liquid content of the reservoir visible. With the reservoir is provided an air relief and is associated a meter in the outlet duct leading from the reservoir, this meter being located beneath the reservoir and in the delivery line.

Hitherto metering dispensing pumps and other apparatus have been impractical due, for example, to leakage of air into the apparatus through the foot-valves, joints and other connections, which air, flowing through the meter, would render the indication or record of the metering means inaccurate.

Visible containers have also been utilized with liquid dispensing devices but these again are open to certain objections in the trade. I have aimed to overcome the objections of both types of device while retaining all of the advantages and adding others in my apparatus which enables the purchaser to see the supply of gasoline which is being delivered to his tank and at the same time to be certain of accurate measurement because of the metering means and because of the fact that nothing but liquid is flowing through and actuating said meter.

The visible type reservoir also permits the attendant to note when his main supply of liquid is exhausted, because ordinarily the pump is constructed to deliver liquid to the reservoir in considerable excess over the rate at which it can be dispensed therefrom, and when the level in the reservoir is noted to fall during operation it is an indication that the pump has ceased or is ceasing to deliver due to failure of the main supply.

Yet other objects of my invention are to provide a dispensing apparatus wherein an air and gas and liquid separator is disposed in series between the discharge of the pump and the inlet to the liquid measuring device so that gasoline forced by the pump will be compelled to flow first through the air and gasoline separator prior to reaching the meter or liquid measuring device.

Yet other objects of my invention reside in disposing an air and liquid separator in the constantly open flow line between the pump discharge and the liquid inlet to the meter or liquid measuring device, and in arranging this separator so as to provide the minimum time for the separating of air and gas from the liquid during the flow of the liquid therethrough; and in further providing the separator with means whereby to maintain the flow line from said separator to the meter or liquid measuring device constantly full of liquid irrespective of any leakage in the pump line whereby to keep the meter primed and whereby to prevent the passage of air to the meter or liquid measuring device at all times and particularly on starting up of the pump; to provide an air and liquid separator device insertable in series between the discharge of the pump and the inlet to the meter and through which the liquid must flow on its way to the meter and in providing this liquid separator with means to provide a pool or pocket of liquid in the separator on the discharge side thereof so as to constantly maintain the flow-line to the meter full of liquid at all times, and whereby said pocket is arranged to cause the liquid passing through the separator to flow in a substantially tortuous or indirect path so as to provide an extended path of travel or flow of the liquid through the separator, whereby to afford an increased time interval for the separation of the air and/or gas from the liquid; to provide an air separator of the foregoing type with a relief outlet for permitting the discharge of the air and/or gas to the atmosphere, and if desired, for returning gasoline passing through this relief orifice back to the system at such a point that it can be acted upon by the suction side of the pump and passed to the dispensing nozzle; to provide a liquid dispensing apparatus with an elevated reservoir of relatively large capacity disposed at the top of the apparatus above the inlet to the meter and providing this elevated reservoir with connections to the outlet of the pump and the inlet to the meter, and arranging the device so that the elevated reservoir provides a separator for separating out the gas and air from the liquid and/or also for constantly maintaining the dispensing line from the inlet of the meter to the nozzle at all times full of liquid; to provide such a type of elevated reservoir with a drain device and with mechanism whereby the same may be optionally drained or retained full of liquid to be dispensed; and further, to provide means associated with the draining means whereby to maintain a pool of liquid in the discharge side of the elevated reservoir irrespective of the draining of the inlet side of the elevated reservoir whereby to maintain the meter and dispensing line at all times full of liquid.

and operation to accurately measure the liquid flowing through it from the outlet duct formed by pipes 37 and 39. For example, I contemplate the use of a meter known to the trade as the Keystone meter, as being suitable for my purpose. Leading from the meter 40 is the elbow 41 to which is threadedly connected the flexible dispensing hose or pipe 42 terminating in a nozzle member 43 leading to delivery spout 43—a. A self-closing valve is included in the nozzle member 43, being actuatable by compression of the operating handle 44 acting upon the protruding stem 45 of such valve. Any valve of suitable construction may be utilized for this purpose, namely to automatically cut off flow of liquid through the nozzle member 43 and spout 43—a when the handle 44 is released.

The provision of this self-closing nozzle at the end of the dispensing hose 43 insures the maintenance of a "wet" hose, as it is termed in the trade, or, in other words, it holds liquid in the hose and outlet duct after a dispensing operation, thereby preventing the entrance of air which would render subsequent delivery inaccurate. An emergency valve 41—a is provided in the elbow 41 for use if the hose should burst or leak or if the leak should arise in the nozzle 43, thus preventing the draining of the entire contents of the reservoir 32 in such a contingency.

Mounted in the hollow supporting member 28 is a switch generally indicated by numeral 52 of any suitable construction, one contact thereof being movably mounted upon the slide rod 53. At its upper end this rod 53 is pivotally attached to a lever 54, which in turn is pivoted to the casing 29 at point 54—a, being formed outwardly thereof with a hook line receiving portion or member 54—b having a protruding lug 54—c. It is obvious that a mercury switch of well-known type may be substituted for the switch 52 and mounted upon the lever 54 if so desired.

A plate 59 protrudes from the casing 29 and is apertured as is lug 54—c to receive the shackle of a padlock 60 to lock the receiving member 54—b to the plate 59 when it is desired to maintain the switch 52 in open condition. Pivoted to one side of the plate 59 is a latch 61 which may be swung from inoperative position as illustrated in Fig. 3 to position to intercept and obstruct member 54 after a reduced travel thereon. This is to limit the movement of the nozzle receiving member 54—b to an amount sufficient only to open the switch 52 without opening valve 24—a under certain conditions. In its inoperative position the latch 61 does not interfere with the full movement of the member 54—b.

In the drain pipe 24 there is provided a valve generally indicated by numeral 24—a having an actuating handle or lever arm 24—b to which is pivotally attached the link 62, the latter being slotted at 62—a to permit some movement relative to the lever 24—b. At its upper end the link 62 is pivotally attached to the lever 54 at 62—a. With this arrangement when the receiving member 54—b is moved downwardly a sufficient amount it will open the valve 24—a to permit draining of the contents of the reservoir 32 into the main supply tank. This is concurrent with the opening of the switch 52 so that the functioning of the pump is discontinued at or substantially the same time that the drain pipe is opened for draining the contents of the reservoir through pipes 16 and 24.

A weight 64 is attached to the lower end of the arm 62 and functions to return the valve 24—a to closed position when the nozzle is removed from member 54—b.

In some localities, in order to comply with insurance or other regulations, containers above the ground such as the reservoir illustrated in the drawings must be drained when not being used. To comply with such regulations I have provided the valved drain pipe 24. In other localities the container may be left filled with liquid until it is desired to dispense the same, and for use in the latter localities I provide the latch 61 pivoted to the plate 69 as described above. With the latch swung upwardly from the position illustrated in Fig. 3 only sufficient movement of the receiving member 54—b will be permitted to open the switch 52 without opening valve 24—b, the slot 62—a permitting this limited movement of the arm 62 without operation of the valve 24—a.

Since one of the objects of my invention is to eliminate passage of any air through the meter 40, I provide an air relief valve in the top or head 34 of the reservoir. This head is apertured and threaded to receive a valve casing 90 which has a reduced threaded portion 90—a engaging the threaded aperture of the head 34. In this portion 90—a is provided a valve chamber 90—b having at its upper end the valve seat 90—c through which leads the reduced opening 90—d to a slightly enlarged passage 90—f, there being a shoulder 90—g above and around the port 90—d. A pipe 91 leads from the valve casing 90 to the drain pipe 24 or to any other suitable place such as vent pipe of the gas tank or the like, as the air being released from the reservoir may be highly charged with inflammable vapor and might otherwise create a fire risk if discharged into the open.

Slidably mounted in the valve chamber 90—b is the valve 92 inwardly spaced from the wall of the chamber 90—b and provided with guide lugs 92—a which prevent substantial lateral movement of the valve 92 and thereby maintain it in alignment with its seat during its vertical movement. At its upper end the valve 92 is round or shaped to closely fit against the seat 90—c when in contact therewith. A stud 95 is threaded into the upper end of the valve 92 and extends upwardly through the opening 90—d terminating thereabove in the elongated head 95—a constructed to bridge the outlet 90—d to limit the downward movement of the valve 92 while permitting free circulation of air through the round port 90—d.

The valve 92 is provided with the stem 92—b of reduced diameter at its lower end, this being extended through a float 98 of cork or other like material, plates 98—a being inserted between the nut 92—c threaded on the lower end of the stem 92—b and between the lower part of the valve proper 92 and the upper surface of the float 98. This float is of slightly less diameter than the inner diameter of the cylinder 32 to permit its free rise and fall within the limits of its travel. The weight of the valve and float structure is ample to insure opening of the valve port 92—d when the fluid level drops beneath the float, even though some air pressure may remain in the reservoir.

In the operation of my device when the nozzle 43 is lifted from its receiving member 54—b, weight 64 will move the switch actuating means to close the switch 52 and the valve 24—a, the motor 13 will start, operating the pump 12, which will draw gasoline or other liquid from the main source through the pipe 22 and will deliver it through pipes 15 and 16 into the reservoir 32. The partition or baffle 29—d will deflect and spread the liquid thus delivered serving to maintain a fairly uniform level and to prevent the creation of any turbulent condition over the outlet 29—c. As the liquid rises in the cylinder 32 the air which is therein will escape past the float 98 through the valve chamber 90—b through the port 90—d past the narrow or rectangular head 95—a of stud 95 and through the pipe 91 to its ultimate destination. As the liquid reaches the float 98 when the weight of the float and valve member is overcome by the buoyancy of the float the valve 92 will be raised against its seat 90—c cutting off further escape of air which has now been reduced to a very small amount in the upper dome or head 34. If there is no outlet for the fluid in the reservoir or if the fluid is being withdrawn from the reservoir at a lesser rate than it is being delivered thereinto, as is preferably the case, the pressure in the supply line 15, 16 will rise to a degree greater than that required to open the relief valve 20 and the latter will open, permitting by-pass of the excess of liquid through the pipe 18 and through the pump 12.

When it is desired to dispense a liquid such as gasoline from the reservoir the nozzle shut-off valve is opened by movement of the handle 44 and the liquid will flow into the tank or other location through the spout 43—a. The liquid thus flowing must pass through the meter 40 and the amount of liquid thus delivered will be accurately measured and indicated by the position of the pointer 30—a relative to the dial 30, this pointer being actuated by the meter in the mechanism in any suitable manner.

With the pump delivering fluid at a greater rate than it can be dispensed, the reservoir will be maintained full and a pressure will exist on such fluid even when being discharged through the dispensing hose. This insures a substantially uniform pressure on the liquid flowing through the meter and makes for more efficient measuring by such meter.

The provision of the air relief in the reservoir permits discharge of substantially all of the air which may be delivered into the reservoir due to leaky shut valves, leaky joints, or other causes, and even if a slight amount of air is contained in the body of liquid in the reservoir after closure of the valve 92, such air may rise above the fluid level in the slight air space which is certain to be left in the dome 34 above the float 98.

The self-closing valve 45 insures the maintenance of the hose and outlet duct full of liquid even though the reservoir be drained, and this prevents entrapment of air when the reservoir is refilled.

When it is desired to discontinue the use of the apparatus for some time, the reservoir may be drained by manually depressing the receiving member 54—b and opening the nozzle valve 45, after which a nozzle may be placed upon the receiving member 54—b and the entire inlet and outlet line, including the reservoir and meter, may be drained. When the tank has been thus completely drained, air will have entered the metering device 39 and the hose 42 and it is advisable in again using the apparatus to permit some flow of liquid through the outlet duct, meter and dispensing hose before delivery is commenced in order that all of the air in the outlet line and meter may be dispelled before reliance is had on the indication of the meter.

When the nozzle 43 is removed from its receiving member as described, the pump will immediately start operation. The operator will withhold opening the valve in the nozzle 43 until the reservoir is filled or substantially so, after which delivery may be commenced. During all of this time the pump 13 is functioning and a continuous supply of liquid is delivered to the reservoir 32.

When the nozzle 43 is again placed on the hook member 54—b, valve 24—a will be opened as described above and substantially all of the liquid in the reservoir will be drained into the main tank. Unless nozzle valve 45 has been opened, however, the entire outlet line will still be full of liquid and entrapment of air therein will be prevented when the reservoir is again filled.

In the form of my invention shown in Figs. 1 and 2, I have disclosed the use of a float for controlling the valve and governing the passage of air and liquid through the pipe 91 back to the drain 24 or to the vent pipe of the gas tank for the purpose of preventing the passage of air to the meter during the dispensing operation. In this first construction the valve controlled by the float will remain open during the period preliminary to the passage of the liquid to the meter, however, when liquid accumulates in the cylinder 32, the float will operate to close the valve so that in this first form of my device, it is possible to carry off any air pumped ahead of the liquid before it enters the meter, but after the delivery of the liquid starts, it is not possible to separate and carry off the air or vapor bubbles entrained in the liquid, because the float closes the valve.

In the form of my invention shown in Fig. 4, I have provided an improved and more economical device for separating all of the air and undesirable gases from the liquid on its passage to the meter and for preventing such air and gas passing through the meter, and I have accomplished this in a manner so as to eliminate all valves, substituting in place thereof the type shown in Fig. 4, embodying a simple gasoline-containing chamber for separating the bubbles, the upper end of which is attached to a comparatively small diameter pipe which remains open at all times and is in communication with the drain pipe, in turn connecting with the gasoline reservoir. In this form of my invention, the narrow pipe or restricted outlet offers much less resistance to the flow of gas than to the flow of liquid, and consequently the pipe operates to carry off air rapidly accumulating in the cylinder. During the dispensing operation of this form of my device, liquid will be forced by pump through the delivery pipe 16, will fill the cylinder 32. During this period, air will be free to flow unrestrictedly out through a constantly open but restricted pipe to the gas tank, and then to the atmosphere, and thereafter when the cylinder 32 fills and flows through the meter during the dispensing operation, only a small fraction of the liquid delivered will flow back through the pipe 91—a to the tank whereby, however, any entrained gas or air in the cylinder 32 will be forced to the top and carried along through the restricted passageway 98, while the bulk of the liquid free of bubbles, will be forced through the meter. Also, the restricted outlet 91—a functions as a safety valve, as for instance, when the pressure is increased considerably, all liquid delivered through the pipe 16 from the pump can flow back to the storage tank, whereby the entire force of the highest presumable pump pressure is available to impart the required speed of flow to the quantity of liquid in the dispensing line.

In the form illustrated in Fig. 4 the pipe 91—a leads from the top of the reservoir without any valve means. The pipe is preferably of restricted diameter relative to the diameter of the supply pipe 16, so as to permit escape of air during the filling of the reservoir but to impede or restrict the flow of liquid through the pipe 91—a after the reservoir is filled and during continued operation of the pump. The pipe 91—a is located outside of the reservoir in the form illustrated and leads into the casing 29 at 91—b from which it passes downwardly into communication with the drain pipe 24 at 91—c. This permits by-pass of at least some of the excess of liquid delivered by the pump back into the tank. With this modified construction the by-pass 18 may be unnecessary in some installations depending upon the rate of delivery of the liquid to the reservoir and the rate of flow through the dispensing hose or hoses. The restricted pipe 91—a will result in the setting up of a pressure in the reservoir of desired amount to insure uniform head or pressure upon the meter 40.

It will be obvious that my device is susceptible of modification and of departure from the form illustrated and described, hence I do not wish to be restricted to the form illustrated and described except as defined by the appended claims properly interpreted.

What I claim is:

1. In combination a reservoir, means to supply liquid thereto, including a pump and an electric motor therefor, an outlet duct leading from said reservoir, a dispensing line leading from said duct, a drain pipe, a valve in said drain pipe, a switch in circuit with said motor and actuating means operatively connected to said switch and to said valve, said means including a receiving member linked with said actuating means and constructed and arranged to receive a portion of said dispensing line, the weight of which will operate said actuating means to open said switch and valve, and a weight for said actuating means effective upon the removal of said line to actuate said means to close said switch and said valve.

2. In combination a reservoir, means to supply liquid thereto, including a pump and an electric motor therefor, an outlet duct leading from said reservoir, a dispensing line leading from said duct, a drain pipe, a valve in said drain pipe, a switch in circuit with said motor and actuating means operatively connected to said switch and to said valve, said means including a receiving member constructed and arranged to receive a portion of said dispensing line, the weight of which will operate said actuating means to open said switch and valve, and means operable to limit the movement of said receiving member to permit opening of said switch while preventing opening of said valve.

3. In a liquid dispensing system, the combination with a housing having a pump adapted to be connected to a liquid containing reservoir, actuating means for the pump, including control means, said pump having an upstanding conduit discharging into an elevated reservoir, said elevated reservoir having an outlet connected to a meter mounted on said support below said second reservoir, said meter discharging into a flexible hose terminating in a valve-controlled nozzle, means for draining said elevated reservoir while maintaining the conduit therefrom to the meter full of liquid, and shiftable means for actuating the draining means, and mechanism for interconnecting the pump control means whereby to operate the draining mechanism upon the cessation of the pump.

4. In a liquid dispensing system, the combination with a housing having a pump adapted to be connected to a liquid containing reservoir, said pump having an upstanding conduit discharging into an elevated reservoir, actuating means for the pump including control means, said elevated reservoir having an outlet connected to a meter mounted on said support below said second reservoir, said meter discharging into a flexible hose terminating in a valve-controlled nozzle, means for draining said elevated reservoir while maintaining the conduit therefrom to the meter full of liquid, shiftable means for actuating the draining means, mechanism for interconnecting the pump control means and the drainage actuating mechanism whereby to operate the draining mechanism upon the cessation of the pump, and means for rendering the drain operating mechanism inactive upon operation of the motor operating mechanism, if desired.

5. In a liquid dispensing apparatus, the combination with a housing, a pump connected to a source of liquid to be dispensed, a meter terminating in a flexible hose provided with a valve-controlled nozzle, a reservoir discharging to said meter and having an inlet connected with the pump, a shiftable pump control member on said housing, said shiftable member having connections to the motor circuit for the pump and having shiftable connections to the drain operating mechanism, and means associated with said member and with said drain operating mechanism whereby on operation of the member to throw out the pump said drain operating mechanism may be rendered operative or inoperative at will.

6. In a liquid dispensing system comprising liquid pumping means adapted to be connected to a source of liquid, a meter, a reservoir disposed between the pump and the meter for preliminarily receiving liquid forced by the pump through the meter, means for draining the reservoir, said meter having a discharge hose, a support for the hose when not in use, and means controlled by the support for stopping the pumping means when the hose is on the support and for operating the draining means.

7. In a liquid dispensing device, the combination of pumping means, a motor having a switch for starting and stopping the pump, a meter, a reservoir disposed between the pump and meter for preliminarily receiving liquid forced by the pump through the meter, means for draining the reservoir, and common means for simultaneously opening said switch and opening said draining means.

8. In a liquid dispensing device, the combination of pumping means, a motor having a switch for starting and stopping the pump, a meter, a reservoir disposed between the pump and meter for preliminarily receiving liquid forced by the pump through the meter, means for draining the reservoir, and common means for operating said switch and draining means including mechanism for draining the reservoir without starting the motor.

9. In a liquid dispensing device, the combination of a pumping means, a motor having a switch for starting and stopping it, a meter, a reservoir disposed between the pump and motor for preliminarily receiving liquid forced by the pump through the meter, means for draining the reservoir, common means for operating said switch and draining means including mechanism for draining the reservoir without starting the motor, and instrumentalities for locking the mechanism in the latter position.

10. In a liquid dispensing device, the combination of a pumping means, a motor having a switch for starting and stopping it, a meter, a reservoir disposed between the pump and meter for preliminarily receiving liquid forced by the pump through the meter, means for draining the reservoir, and common shiftable means for operating the switch and draining means including instrumentalities for limiting the shifting movement of said means for stopping the pump while opening the draining means.

11. In a liquid dispensing device, the combination of pumping means, a motor having a switch for starting and stopping it, a meter, a reservoir disposed between the pump and meter for preliminarily receiving liquid forced by the pump through the meter, means for draining the reservoir, and interconnected means for operating both said means or selectively operating either one without the other.

AUSTIN L. WERTZ.